United States Patent [19]

Huang

[11] Patent Number: 5,199,737
[45] Date of Patent: Apr. 6, 1993

[54] METHOD OF CONTROLLING A SEMI-ACTIVE CHASSIS

[75] Inventor: Zhen Huang, Wuppertal, Fed. Rep. of Germany

[73] Assignee: August Bilstein GmbH & Co. KG, Ennepetal, Fed. Rep. of Germany

[21] Appl. No.: 816,183

[22] Filed: Jan. 2, 1992

[30] Foreign Application Priority Data

Feb. 14, 1991 [DE] Fed. Rep. of Germany ....... 4104398

[51] Int. Cl.$^5$ ............................................. B60G 17/08
[52] U.S. Cl. ................... 280/707; 364/424.05
[58] Field of Search ................ 280/707, 840, DIG. 1; 364/424.05

[56] References Cited

U.S. PATENT DOCUMENTS

| 5,013,067 | 5/1991 | Mine et al. | 280/840 |
| 5,025,899 | 6/1991 | Lizell | 280/707 |
| 5,060,157 | 10/1991 | Tado et al. | 364/424.05 |
| 5,072,392 | 12/1991 | Taniguchi | 364/424.05 |

Primary Examiner—Kenneth R. Rice
Attorney, Agent, or Firm—Max Fogiel

[57] ABSTRACT

A method of controlling the resilience of a vibration suppressor for motor vehicles with variable valves. The controls (RG) generate a parameter (I) for varying the resilience (D) and distinguish between once-only and periodic roadway excitation ($x_E$), whereby the controls parameters are the detected difference in speed between the body mass ($m_a$) and the wheel mass ($m_R$) along with either the body acceleration ($a_a$) or the body speed ($v_a$).

13 Claims, 8 Drawing Sheets

METHOD OF CONTROLLING A SEMI-ACTIVE CHASSIS

BACKGROUND OF THE INVENTION

The invention concerns a method of controlling the resilience of variable vibration suppressors in a semi-active chassis with variable valves. The structure of a semi-active chassis is explicable in terms of an oscillator comprising two masses—a non-resiliently supported "wheel mass" consisting of the wheels and their bearings and, resting thereon, a "body mass" consisting of the vehicle's participating superstructure. The two masses are separated by a system of springs and dashpots. A chassis of this type attains two contradictory objectives. The wheels of a vehicle in motion over a to-some-extent necessarily uneven roadway will transmit vibrations to the body. The vibrating wheels and body will be detrimental to the passengers' comfort and safety. The purpose of the chassis is accordingly to guide the wheels as straight as possible over the roadway, to maintain as much resilience as possible between the wheels and the ground, and to compensate for motions of the axle deriving from irregularities in the roadway in order to increase the passengers' comfort. Varying the resilience of the suspension in accordance with excitation on the part of the roadway will result in extensive absorption of the vibrations and ensure a safe ride.

A known principle for varying the resilience of a suspension system is the skyhook algorithm. When the difference between the speed of the body and that of the axis opposes the body's vertical speed, the resilience is kept soft. When that difference is the same as the body speed, or when the resilience opposes the body speed, the resilience is hardened.

A principle for varying the resilience of a vibration suppressor with variable valves in accordance with irregularities in the roadway is known form German OS 4 015 972. The resilience is varied in accordance with this principle, Huang's algorithm, by closing a bypass when the product of the body acceleration and the difference between the speed of the body mass and that of the wheel mass is greater than zero and opening it when the produce is less than zero.

These procedures very satisfactorily ensure compliance with the demands for safety and comfort in the event of once-only roadway excitation by extensively absorbing any vibrations that occur. To maintain consistency, however, the resilience must be constantly varied between soft and hard, leading to annoying knocks in conjunction with periodic roadway excitation and having a negative effect on the passengers' perception of the drive.

SUMMARY OF THE INVENTION

The object of the invention is accordingly a method of controlling a semi-active chassis for motor vehicles that will comply with the demands for driving safety and maximal possible comfort in the event of either once-only roadway excitation or periodic roadway excitation.

This object is attained as recited in the body of claim 1, with each wheel having a sensor that detects the difference between the speed of the body mass and that of the wheel mass, a sensor that detects the acceleration of the body, and/or a sensor that detects the speed of the body. The body's speed, however, can alternatively be calculated from its acceleration.

Once roadway excitation has been detected, the controls will determine whether it is once-only excitation or periodic excitation and, if it is once-only, will emit a parameter in accordance with either Huang's algorithm or the skyhook principle.

Periodic roadway excitation is long-wave when the mathematical sign of body acceleration does not change during a period that defines long-wave excitation. Resilience is hardened.

To eliminate the effects of incorrect detection deriving from harmonics, especially when the body acceleration is traveling through zero, the resilience will, once long-wave roadway excitation has been detected for the first time, remain hard during a period of deceleration subsequent to the first change in the mathematical sign of the body acceleration.

Short-wave roadway excitations are detected by comparing the intervals between hardening signals with half a period that defines short-wave excitation. If the signals occur more rapidly than the half periods that characterize short-wave excitation, the resilience is softened.

When periodic roadway excitation occurs and neither short-wave nor long-wave excitation is detected, the controls will emit a parameter in accordance with the algorithm for once-only roadway excitation.

The sensors in one cost-effective version are mounted only on the front suspension system, and the signals representing the rear-axle relative speed and body acceleration are calculated delayed from the signals associated with the front axle. The delay is calculated from the distance between axles and from the vehicle's speed. The optimal resilience for a particular level of safe driving and as a compromise therewith for satisfactory comfort is affected not only by the instantaneous roadway excitation but also by such parameters as angle of turn, dive, vehicle speed, and fluid level. These participate as auxiliaries in the circuitry, constructing the parameters for varying resilience from the controls outputs and from the adjustment components of the auxiliary parameters.

BRIEF DESCRIPTION OF THE DRAWINGS

The invention will now be specified with reference to the accompanying drawing, wherein.

DESCRIPTION OF THE PREFERRED EMBODIMENTS

Figure 1:
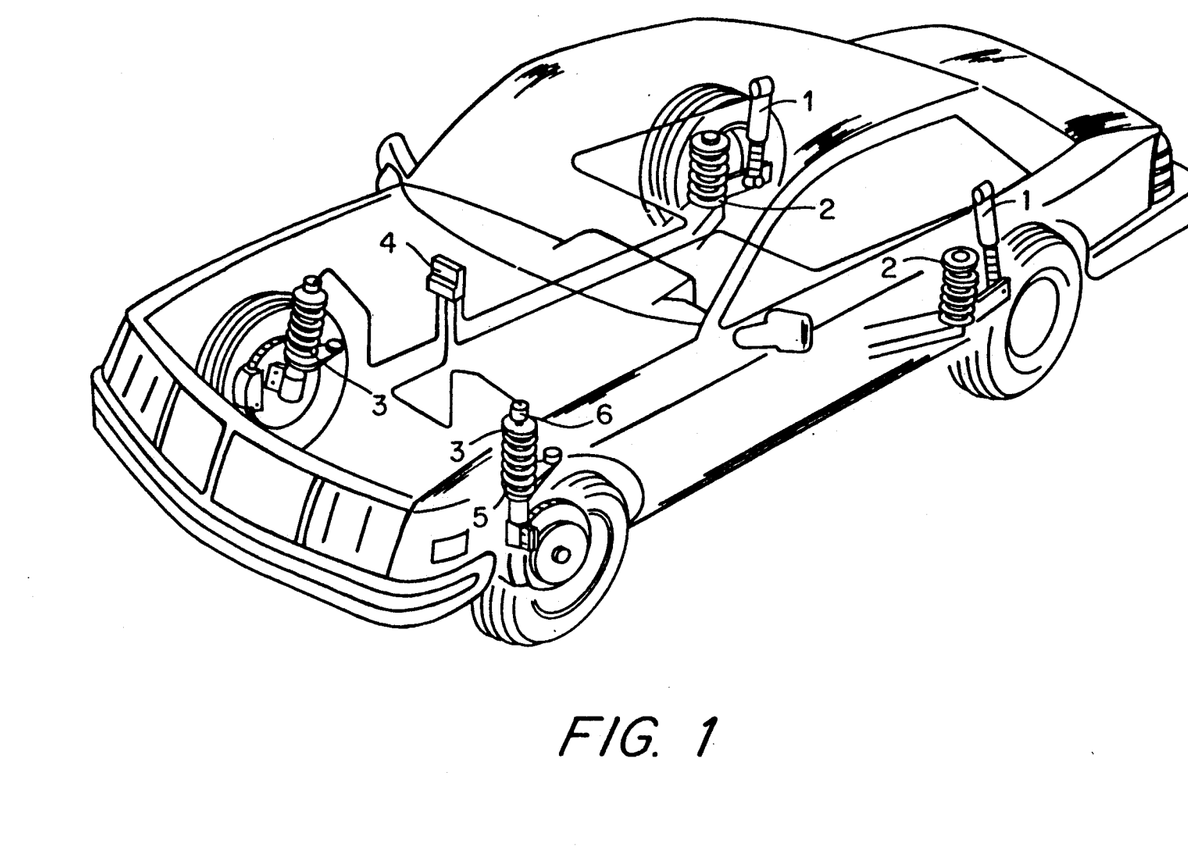
FIG. 1 illustrates an embodiment of a chassis with four vibration suppressors.

FIG. 1 illustrates a motor-vehicle chassis with four vibration suppressors. The rear axle rests on two dashpots 1 and two helical springs 2 and the front suspension includes "level-regulated" telescoping rods 3. Dashpots 1 and telescoping rods 3 suppress relative motion between the non-resiliently supported masses of the wheels and their suspensions and the resiliently supported participating superstructure of the vehicle. Resilience is varied by controls 4, which are part of the vehicle's computer. Controls 4 calculate from the signals from speed sensors 5 and acceleration sensors 6 a parameter for varying the resilience. There is one speed sensor and one acceleration sensor for each dashpot 1 and telescoping rod 3.

Figure 2:
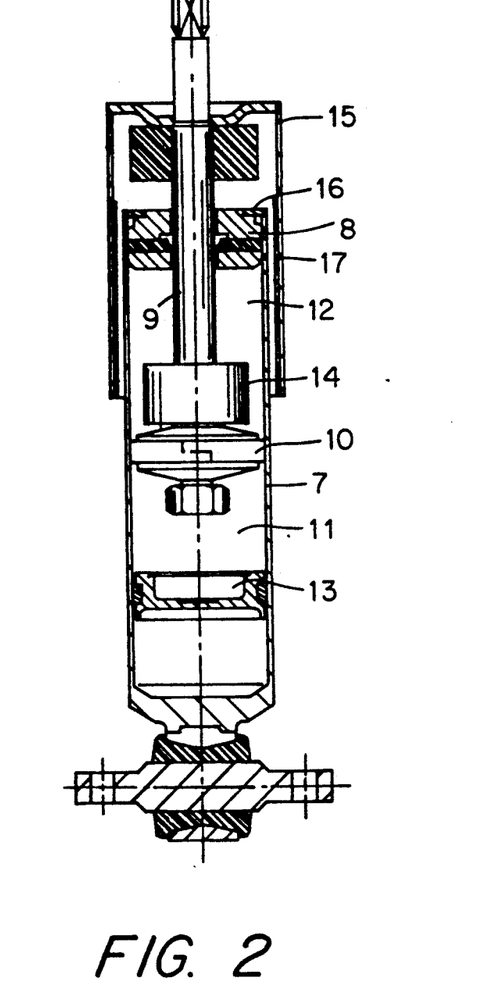
FIG. 2 illustrates the structure of a variable dashpot with a built-in speed-difference sensor.
Figure 3:
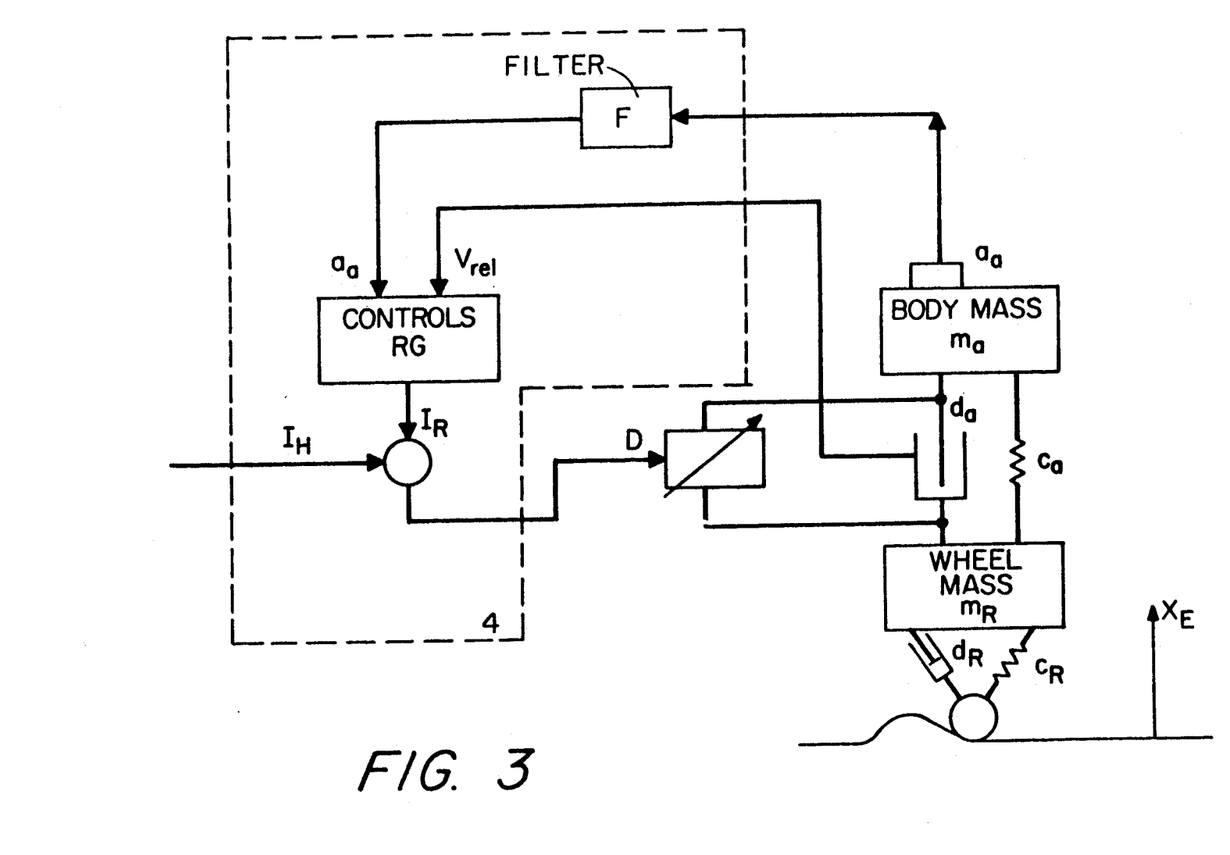
FIG. 3 is a block diagram illustrating how the chassis is controlled.

FIG. 2 illustrates the structure of the hydraulic dashpot 1 employed in the chassis illustrated in FIG. 1. This variable single-cylinder dashpot consists essentially of a cylinder 7 with a base 8 perforated to accommodate a piston rod 9 secured to a piston 10. The piston divides the cylinder into two sections 11 and 12 that communicate through unillustrated valves. The top of the cylinder is protected by an outer cylinder 15. Below a partition 13 is a gas-filled section that compensates for increases and decreases in the volume of gas in the upper portion of the inner cylinder due to the entry and exit of piston rod 9. Also included in piston 10 is a bypass with a variable two-way magnetic valve 14 for varying the resilience between soft and hard.

The speed-difference sensor comprises a permanent magnet 16 integrated into base 8 for example and a coil 17 mounted against the inner surface of outer cylinder 15. The ends of coil 17 extend out toward the vehicle's body and into an unillustrated processor.

The control procedure will now be specified in relation to a single wheel by way of example and with reference to the block diagram in FIG. 2. The linear system of two masses—the resiliently supported participating body mass $m_a$ and the non-resiliently supported wheel mass $m_R$. Between the two masses is a dashpot-and-spring system with a spring constant $c_a$ and a dashpot constant $d_a$. Spring constant $c_R$ and dashpot constant $d_R$ on the other hand belong to a system directly adjacent to the wheel. The difference $v_{rel}$ between the speed of body mass $m_a$ and that of wheel mass $m_R$ is measured by speed sensor 5 and forwarded directly to controls RG. The acceleration sensor 6 on body mass $m_a$ measures body acceleration $a_a$ and forwards it to a filter F. The filter filters out any interference above a specific level.

The filtered signal enters controls RG, which calculate by one of the algorithms in accordance with the invention an output $I_R$ for varying the behavior of the vibration suppressor. The algorithm employed for once-only roadway excitations in the present embodiment by way of example is Huang's algorithm.

Controls output $I_R$ is employed in conjunction with the controls-parameter component $I_H$ of such auxiliary parameters as angle of turn, brake activation, vehicle speed, and level control to construct a parameter I for controlling the resilience.

When the skyhook principle is employed with once-only roadway excitations, the body speed is measured or for example calculated from the body acceleration along with the difference between the speed of the body and that of the wheel mass.

FIGS. 4 through 7 represent the signals involved in the difference between the speed of the body and that of the wheel mass for both once-only and periodic roadway excitation.

Figure 4:
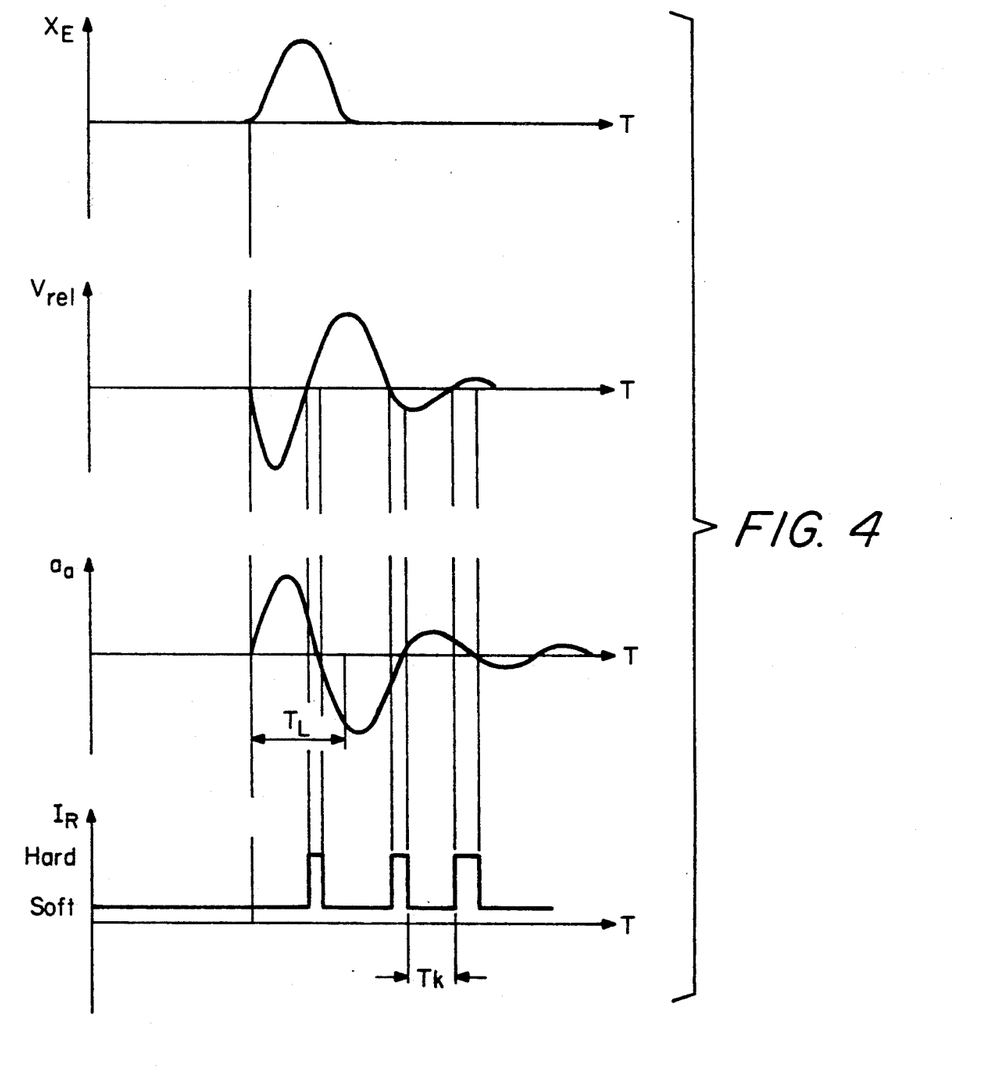
FIG. 4 is a graph illustrating the signals involved in handling once-only roadway excitations by Huang's algorithm.

In the event of once-only roadway excitation, controls RG will calculate a parameter as illustrated in FIG. 4 in accordance with Huang's algorithm. If the product of difference $v_{rel}$ and body acceleration $a_a$ is greater than zero, controls RG will emit a parameter hardening the resilience, which is soft while the vehicle is traveling over smooth roadway. If the mathematical sign of the product changes, bypass will open and soften the resilience in order to accommodate the vibrations of body mass $m_a$. Controls RG will continuing emitting signals for alternately opening and closing the bypass until the roadway excitation completely disappears. In the event of periodic roadway excitation, which can occur when a vehicle is driven over a superhighway or cobblestones, the controls will distinguish between short-wave and long-wave excitation.

Figure 5:
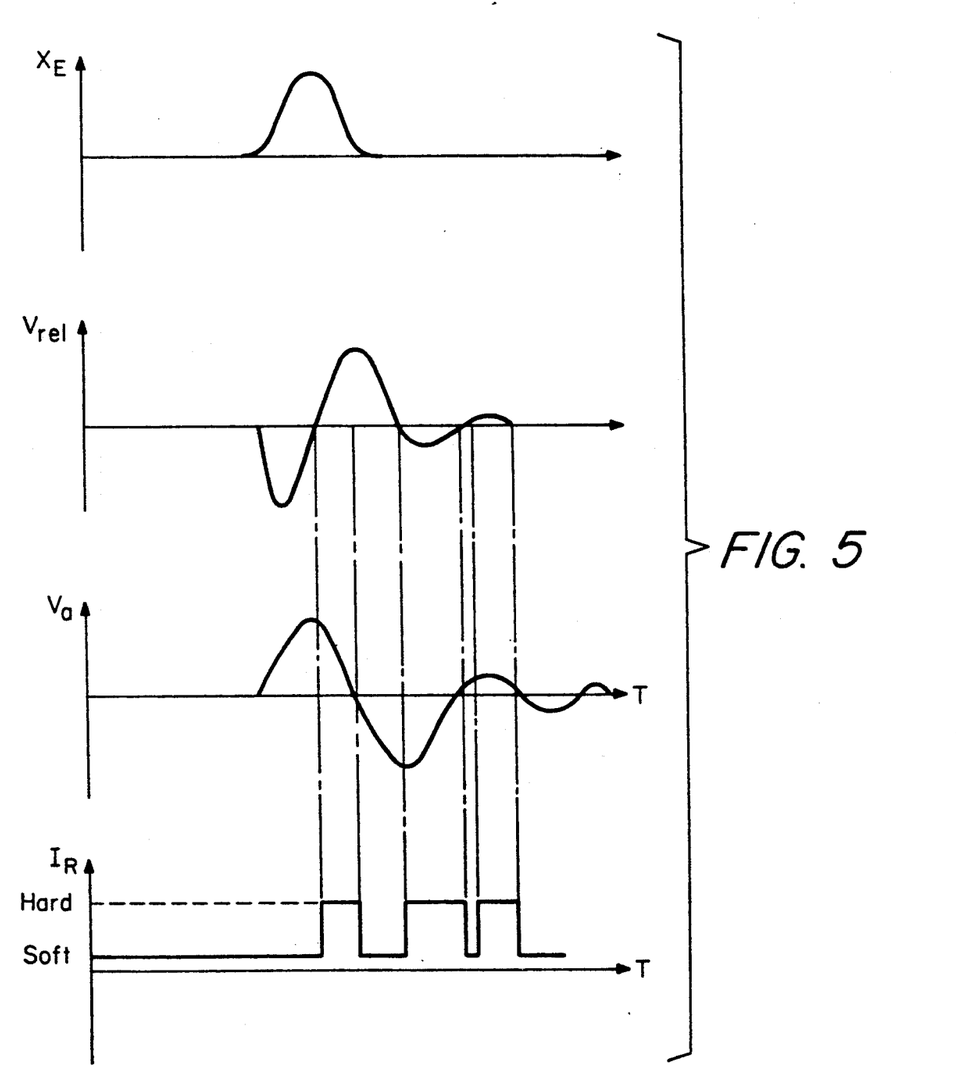
FIG. 5 is a graph illustrating the signals involved in handling once-only roadway excitations by the skyhook principle.

When the skyhook principle is employed in conjunction with once-only roadway excitations $x_E$, body speed $v_a$ must, in addition to difference $v_{rel}$, be calculated from body acceleration $a_a$ or measured directly in order to vary the resilience. When the product of body speed $v_a$ and difference $v_{rel}$ is greater than zero, the resilience is hardened. When on the other hand difference $v_{rel}$ opposes the body speed, meaning that the product is zero or less, the controls will generate an output $I_R$ that softens the resilience. FIG. 5 illustrates the associated signals.

Figure 6:
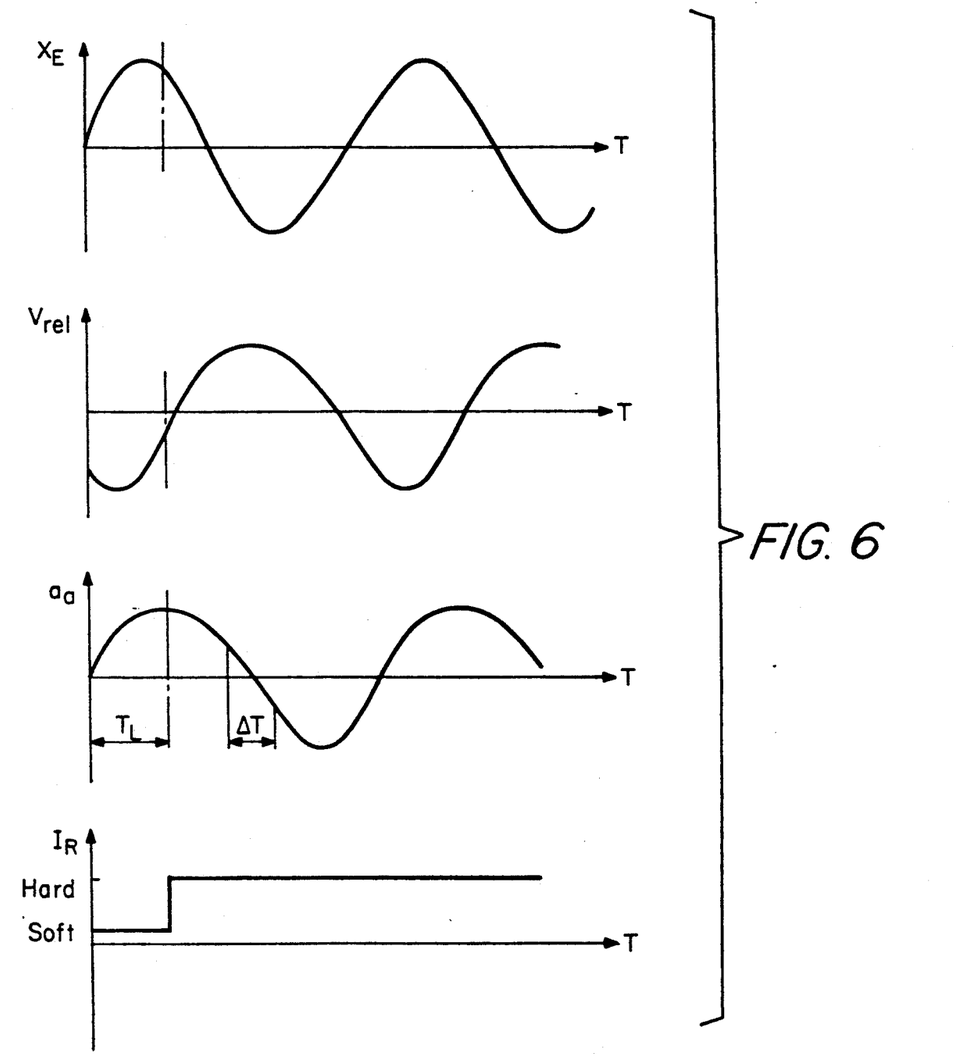
FIG. 6 is a graph illustrating the signals involved in long-wave periodic roadway excitation.
Figure 7:
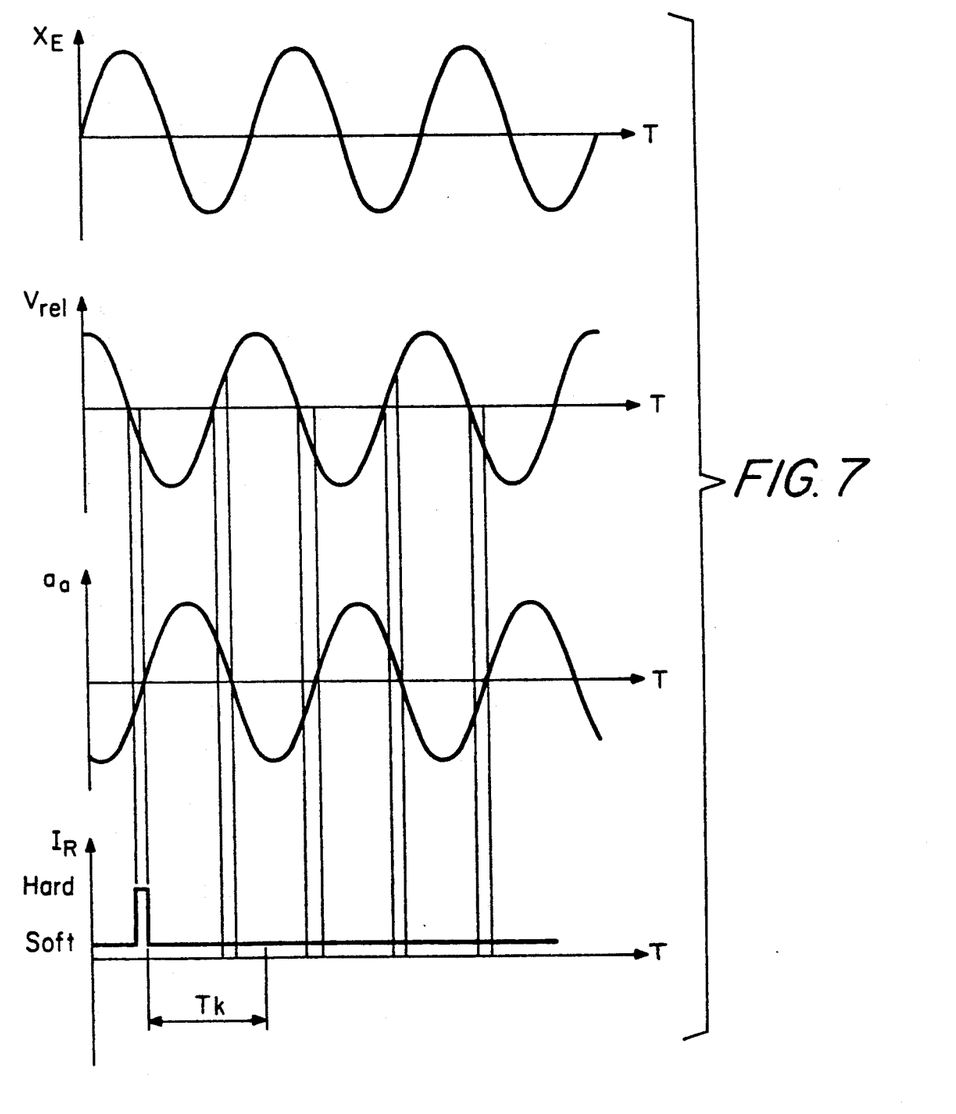
FIG. 7 is a graph illustrating the signals involved in short-wave periodic roadway excitation.
Figure 8:
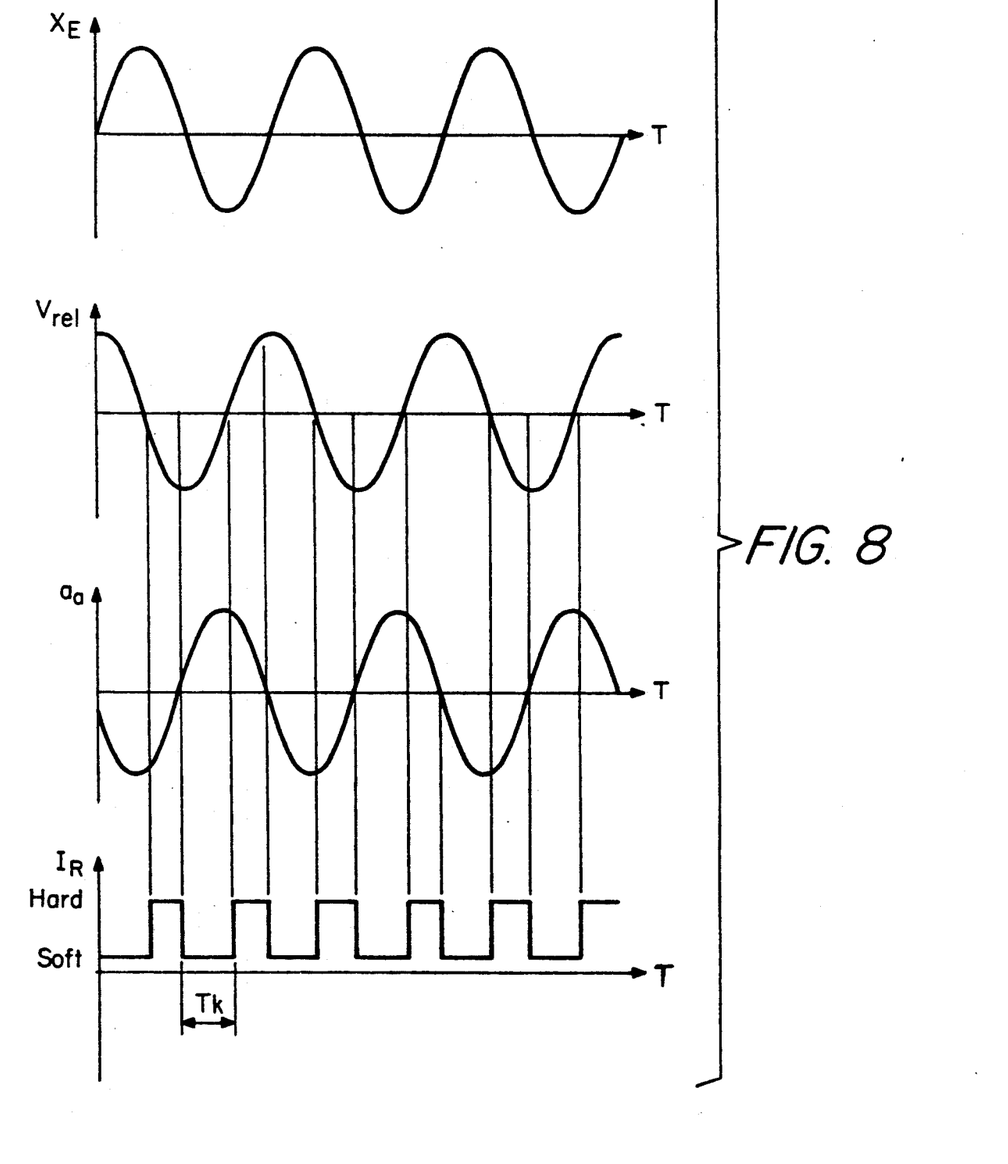
FIG. 8 is a graph illustrating the signals involved in medium-wave periodic roadway excitation.

When controls RG detect long-wave roadway excitation $x_E$, meaning that the mathematical sign of body acceleration $a_a$ does not change during a period $T_L$ that defines long-wave excitation, a controls output $I_R$ that closes the bypass will be generated (FIG. 6). Subsequent to the once-only detection of long-wave periodic roadway excitation $x_E$, the resilience will not be softened, but will remain hard in order to exclude errors, especially those deriving from the short-wave harmonics that occur during body acceleration, during a waiting time T subsequent to the first change in the mathematical sign of body acceleration $a_a$. The duration of waiting time T depends on how rapidly the vehicle is traveling.

In the event of short-wave roadway excitation $x_E$ as illustrated in FIG. 5, controls RG will during the first period of vibration emit an output $I_R$ for once-only excitation, although it will subsequently detect, by comparing the time T of the self-calculated controls output $I_R$ for hardening with the period $T_K$ that defines short-wave roadway excitation $x_E$, short-wave excitation and will soften the resilience.

Safe driving can be ensured by including in the calculations such auxiliaries as speed of travel, dive, angle of turn, and level regulation. These auxiliary parameters can in special situations like driving around curves, harden the resilience even in the event of short-wave roadway excitation.

When in the event of periodic roadway excitation the controls detect neither short-wave nor long-wave excitation (FIG. 6), the controls will emit the same output as in the event of once-only excitation.

I claim:

1. Method of controlling a semi-active chassis of a vehicle with variable dashpots having controlled valves, a wheel mass and a body, comprising the steps of: measuring a difference between the speed of the wheel mass and that of the body; measuring acceleration of the body, and selectively speed of the body; forming input parameters from said measuring steps for controls generating a parameter for adjusting resilience of said dashpots; distinguishing between once-only roadway excitation and periodic roadway excitation when said controls detect a roadway excitation ($X_E$); generating an output parameter $I_R$ by said controls in the event of a once-only excitation in accordance with either a skyhook principle or Huang's algorithm to construct a parameter for varying said resilience (D); detecting by said controls long-wave excitation in the event of periodic excitation such that a mathematical sign of body acceleration ($a_a$) does not change during a period ($T_L$) defining long-wave excitation, said controls detecting short-wave excitation wherein intervals (T) between signals hardening resilience are compared with half a period ($T_K$) defining short-wave excitation such that, when $T < T_K$, said controls will generate an output parameter that softens the resilience and, when long-wave excitation is detected, said controls will generate an output parameter that hardens the resilience; said controls generating an output parameter in accordance with an algorithm for once-only excitation in event of periodic excitation when neither short-wave nor long-wave excitation is detected.

2. A method as defined in claim 1, wherein said controls emit in accordance with Huang's algorithm an output parameter ($I_R$) such that, when the product of body acceleration ($a_a$) and difference ($V_{rel}$) in speeds is greater than zero, the resilience is hardened and, when the product is zero or less, the resilience is left as is or softened.

3. A method as defined in claim 1, wherein said controls emit in accordance with the skyhook principle an output parameter ($I_R$) such that, when the product of body speed ($V_a$) and difference between the body speed and vertical wheel speed ($V_R$) is greater than zero, the resilience is hardened and, when the product is zero or less, the resilience is left as is or softened.

4. A method as defined in claim 1, wherein once long-wave periodic roadway excitation ($X_E$) has been initially detected, the resilience will remain hard during a waiting time (T) subsequent to the first change in mathematical sign of body acceleration ($a_a$).

5. A method as defined in claim 4, wherein length of the waiting time (T) depends on speed (v) of the vehicle.

6. A method as defined in claim 5, wherein length of the waiting time (T) increases with speed (v) of the vehicle.

7. A method as defined in claim 1, wherein the period ($T_K$) that defines long-wave roadway excitation ($X_E$) and the waiting time (T) are selectively stored as constants in the controls.

8. A method as defined in claim 1, wherein the parameter (I) for varying the resilience is constructed from output parameter ($I_R$) of said controls and the control-parameter component ($I_H$) of auxiliary control parameters.

9. A method as defined in claim 8, wherein said control-parameter component ($I_H$) is constructed from said auxiliary control parameters, vehicle speed, angle of turn, and selectively brake activation.

10. A method as defined in claim 8, wherein level regulation participates in capacity of an auxiliary parameter in said controls.

11. A method as defined in claim 1, wherein each wheel in the chassis has sensors for detecting body acceleration ($a_a$) and speed difference ($V_{rel}$).

12. A method as defined in claim 1, wherein only a front axle has sensors for detecting body acceleration ($a_a$) and speed difference ($V_{rel}$), whereby signals for a rear axle are derived from signals for the front axle.

13. A method as defined in claim 12, wherein the signals for the rear axle are derived delayed from the signals for the front axle, whereby the delay has a length calculated from wheel base and speed (v) of the vehicle.

* * * * *